July 9, 1957

C. A. ELLIS ET AL 2,798,408

VISION TESTING DEVICES

Filed March 9, 1953

INVENTORS
CHARLES A. ELLIS
HENRY B. COLE
BY
*Louis L. Gagnon*
ATTORNEY

July 9, 1957

C. A. ELLIS ET AL 2,798,408

VISION TESTING DEVICES

Filed March 9, 1953

INVENTORS
CHARLES A. ELLIS
HENRY B. COLE
BY
Louis L. Gagnon
ATTORNEY

INVENTORS
CHARLES A. ELLIS
HENRY B. COLE
BY
Louis L. Gagnon
ATTORNEY

July 9, 1957  C. A. ELLIS ET AL  2,798,408
VISION TESTING DEVICES
Filed March 9, 1953  6 Sheets-Sheet 6

INVENTORS
CHARLES A. ELLIS
HENRY B. COLE
BY
Louis L. Gagnon
ATTORNEY

2,798,408

VISION TESTING DEVICES

Charles A. Ellis, Southbridge, Mass., and Henry B. Cole, East Woodstock, Conn., assignors to American Optical Company, Southbridge, Mass., a voluntary association of Massachusetts Application March 9, 1953, Serial No. 341,006

17 Claims. (Cl. 88—20)

This invention relates to vision-testing devices and has particular reference to improved means for performing visual classification tests for checking visual deficiencies under standardized conditions.

One of the objects of this invention is to provide an improved vision-testing device for checking the binocular and single binocular vision of an individual to detect visual errors and the characteristics thereof for both near and distant vision, said device being of a small, compact and rugged nature, entirely self-contained and adapted to be operated with a minimum of manipulations, with a high degree of accuracy, and at reduced time cycles.

Another object is to provide a compact vision-testing device embodying an improved lens system through which an individual views a relatively large target field which is comprised of strip film having sets of test characters thereon and which is illuminated by improved built-in means whereby substantially no visual stimulation is provided outside the target area.

Another object is to provide a device of the above character wherein unbreakable targets are mounted in controlled adjustable spaced relation with an improved adjustable lens system, all within a dust sealed housing.

Another object is to provide an instrument of the above character which embodies a lens system which may be adjusted to two known positions for forming, at each position, a virtual image of a target located at a predetermined distance from said lens system, said images being, to the viewer, apparently located at respective near viewing and distance viewing positions while the angular magnification thereof remains constant.

Another object is the provision of improved illuminated indexing means for indicating to an operator the particular test characters being used.

Other objects and advantages of the invention will become apparent from the following description taken in connection with the accompanying drawings, in which:

At the present time, there appears to be a great demand for a simple, compact and portable eye-examining device having self-contained standardized lighting conditions and means whereby visual examinations might be conducted to determine whether correction of the vision of an individual is desirable or necessary. This is particularly true in industry, schools, institutions, and in the armed services.

The present invention provides improved means for satisfying such a demand and embodies a compact, portable device with which an operator may perform accurately and readily a series of vision tests at both near vision and far vision-test distances, either binocularly or monocularly.

Referring more particularly to the drawings wherein like characters of reference designate like parts throughout the several views, the device is essentially a stereoscopic instrument consisting primarily of three basic elements, a stationary base 20, an adjustable supporting member 21 and an optical assembly unit 22.

The base 20 is preferably a casting of a suitable lightweight metal such as aluminum and is designed so as to maintain stability of the device in any of its positions of adjustment.

The supporting member 21 is formed as a box-like structure having front and back walls 23 and 24 respectively, side walls 25, and top and bottom 26 and 27 respectively with portions of the front and back walls 23 and 24 removed to form openings 28 and 29 respectively therein (Figs. 1, 2 and 4) through which the optical assembly unit 22 extends.

Figure 1:
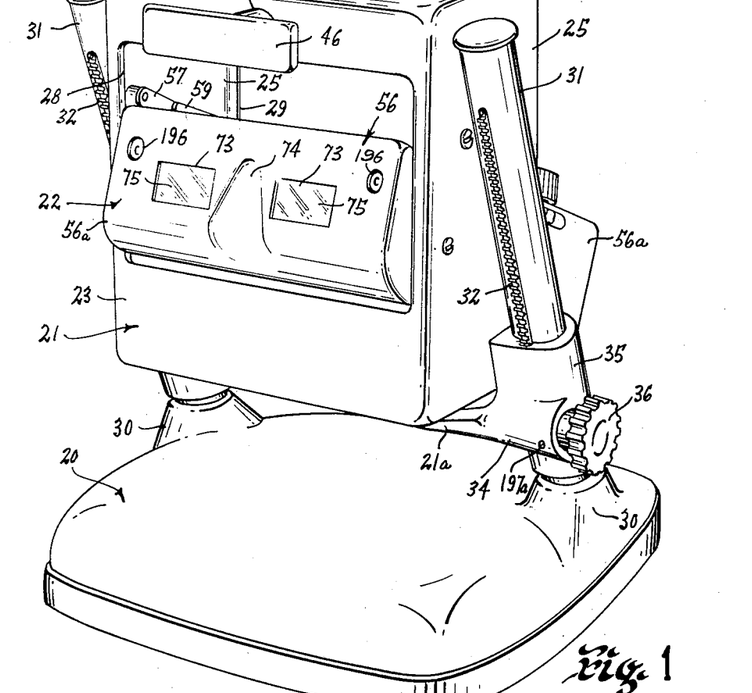
Fig. 1 is a perspective view of a vision-testing device constructed and arranged in accordance with this invention.
Figure 11:
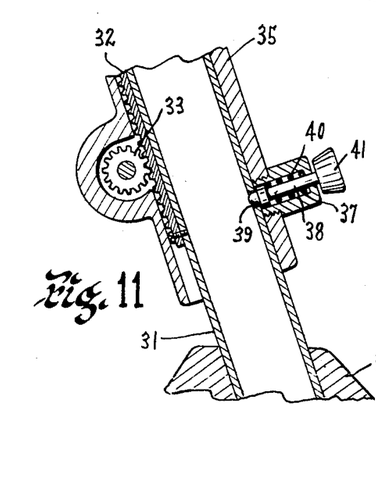
Fig. 11 is an enlarged fragmentary vertical sectional view of the means for adjusting the supporting member and optical assembly unit on the uprights provided therefor.
Figure 12:
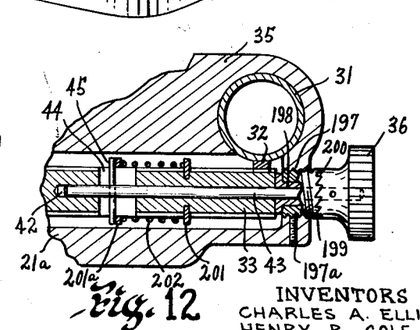
Fig. 12 is an enlarged horizontal sectional view of the operating means for raising and lowering the device on the supports.

The upper surface of the base 20 is provided with a pair of spaced uprights 30 in which are positioned the lower ends of a pair of respective supporting posts 31. Extending beneath the supporting member is a longitudinal member 21a which is provided with upstanding end portions 35, each of which end portions 35 is designed to receive a respective post 31. The front side of each post 31 carries a vertically extending toothed rack 32 in mesh with which are the teeth of an elongated gear 33. The gear 33 is carried within the longitudinally extending member 21a which is connected to the underside of the adjustable supporting member 21. One end of the gear 33 is provided with a longitudinal bore 42 which receives a shaft 43, the shaft 43 extending through the adjacent end portion 35 and carrying a knob 36 (Figs. 1 and 12). The supporting member 21 is normally retained in carrying position by locking means comprising a plug 37 (Fig. 11) which is secured to the opposed end portion 35 and carries a lock pin 38 which is adapted to engage an opening 39 in the adjacent post 31. The pin 38 is urged as by spring 40 into locking position, and a knob 41 is provided on the outer end thereof to be grasped by the operator for unlocking the device when it is desired to raise the supporting member 21.

To raise the supporting member 21, the gear 33 is slotted at 44 (Fig. 12) and a pin 45 is extended within the slot 44 through the shaft 43. Thus, rotation of the knob 36 and consequently of shaft 43 will cause rotation of the gear 33 which, through rack 32, will cause upward movement of the supporting member 21. Means is also provided to prevent the weight of the device from causing it to move downwardly from its desired adjusted position. This means comprises an annular member 197 which is threadedly inserted in the upstanding portion 35 over the end of the shaft 43 and held in place by a set screw 197a. Within the annular member 197 and encircling the shaft 43 is a bushing 198. The exposed surface of the annular member 197 is provided with a series of teeth 199 which are adapted to mesh with similar opposing teeth 200 provided on the inner end of the knob 36. An annular member or collar 201 is fixedly positioned on the gear 33 in spaced relation with the pin 45, as indicated in Fig. 12, and a coil spring 202 is positioned over the gear 33 between the collar 201 and a second sliding collar 201a which is located adjacent the pin 45. The spring 202 functions to urge the shaft 43 inwardly so that the teeth 199 and 200 are normally held in meshed relation. To raise the supporting member 21 to a desired adjusted position, it is merely necessary for the operator to pull the knob 36 outwardly sufficiently to eliminate the interference between teeth 199 and 200 and to rotate the gear 33 as described above. When the supporting member 21 is in the desired adjusted position, the operator will merely release knob 36 which, through the action of spring 202, will immediately be drawn inwardly whereupon teeth 199 and 200 will again be in meshed relation and will prevent the device from dropping.

Figure 6:
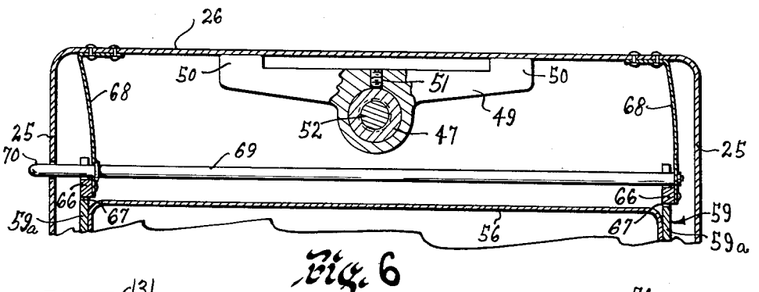
Fig. 6 is a fragmentary vertical sectional view taken substantially on line 6—6 of Fig. 2 looking in the direction of the arrows.

The supporting member 21 also carries an adjustable brow rest 46 on the front thereof above the opening 28. The brow rest 46 is attached to the outer end of a bar member 47 which is slidably mounted in a fixed bearing 48 (Fig. 2) carried by the front wall 23. Carried by the bar member 47 adjacent its inner end is a cross member 49 (Figs 2 and 6) which has upwardly extending end portions 50 which are adapted to engage the top cover plate 26. The cross member 49 is secured to the bar member 47 by a set screw 51. As the bar member 47 slides inwardly and outwardly of the device in bearing 48, engagement of the end portions 50 of the cross member 49 with the cover plate 26 will prevent the bar member 47, and consequently the brow rest 46, from rotating. The bar member 47 is caused to slide by means of a shaft 52 which has one end threadedly inserted into a bore 53 in the inner end of the bar member 47, the shaft 52 being mounted for rotation in a bearing 54 carried by the rear wall 24, the shaft 52 extending through the wall 24 and having a knob 55 on its outer end. The operator can adjust the brow rest 46 by turning the knob 55, which will rotate the shaft 52 and, through the threaded engagement with the bore 53, will cause the bar member 47 to slide in the bearing 48 whereby the brow rest 46 may be positioned as desired.

Figure 2:
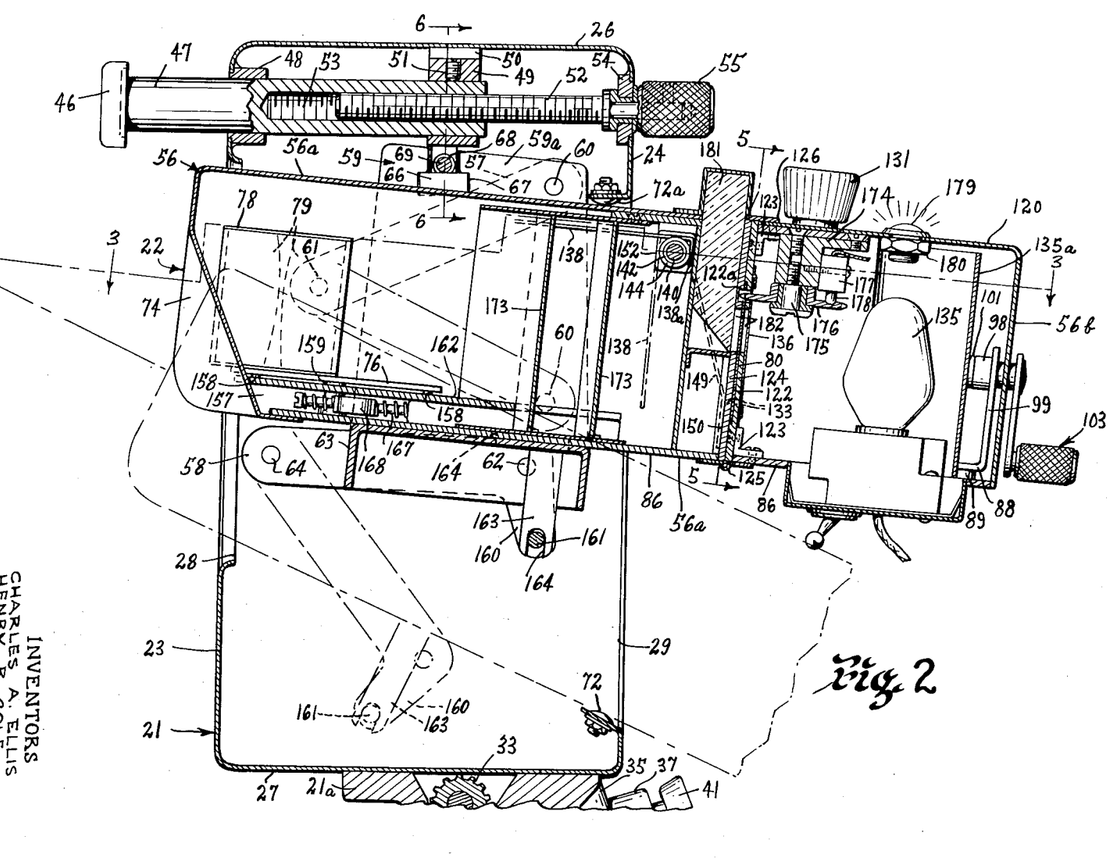
Fig. 2 is an enlarged fragmentary vertical sectional view taken substantially through the center of the device shown in Fig. 1.
Figure 3:
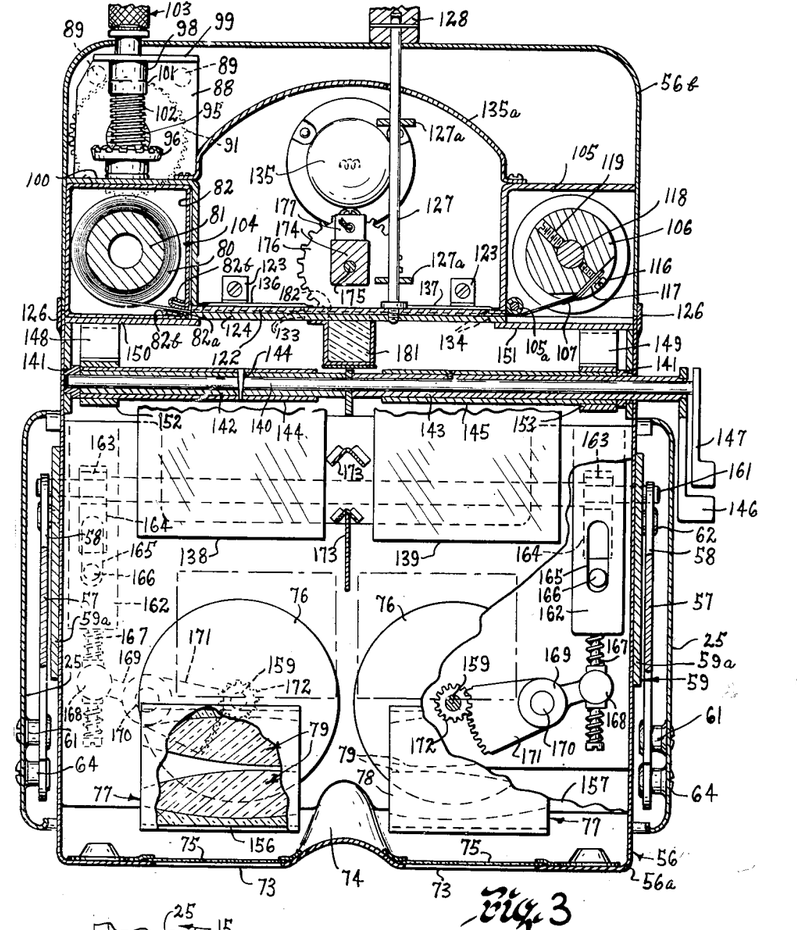
Fig. 3 is a horizontal sectional view taken substantially on line 3—3 of Fig. 2 looking in the direction of the arrows.
Figure 4:
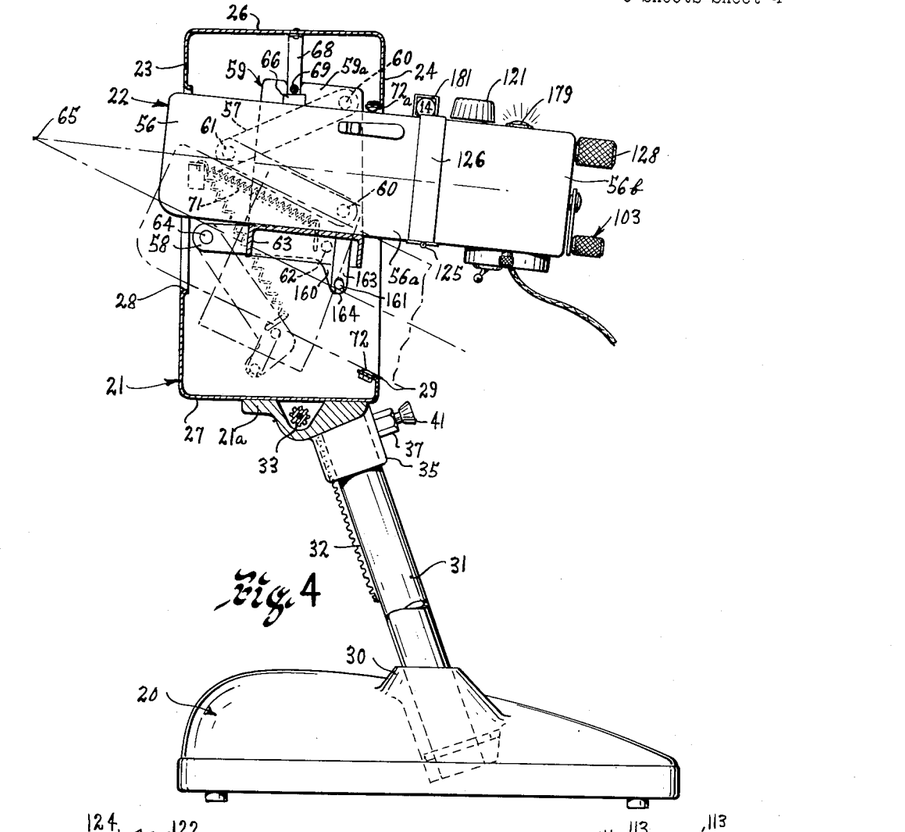
Fig. 4 is a side elevational view partly in section of the device shown in Fig. 1.

The optical assembly unit 22 comprises a box-like housing 56 which is supported on each side thereof within the supporting member 21 by means such as a pair of upper levers 57 and a pair of lower levers 58 as indicated in Figs. 2, 3 and 4. The housing 56 is carried in a substantially U-shaped cradle 59 and one end of the upper levers 57 is connected as by pivot pins 60 to the upper end of the respective upwardly extending arm portions 59a of the cradle 59. The other ends of the levers 57 extend toward the front of the device and are connected to the side walls 25 of the supporting member as by pivot members 61. The lower levers 58 are connected at one end as by pivot members 62 to the base portion 63 of the cradle 59 and extend forwardly of the device with their opposed ends being connected as by pivot members 64 to the side walls 25 below and slightly forwardly of pivot members 61.

With such an arrangement, the housing 56 can be swung as a unit up or down in the supporting member 21 on levers 57 and 58 with initial and final positions as though the assembly had been rotated about a center which is located at some distance from the front of the housing 56. This is shown in Figs. 2 and 4 wherein the effective center is indicated by numeral 65.

Means is provided for retaining the housing 56 in its uppermost position and comprises a pair of latches 66 (Figs. 2 and 6) which are adapted to be positioned in openings 67 provided therefor in the upper ends of the respective arm portions 59a of the cradle 59. The openings 67 are inverted T-shaped and the latches 66 are adapted to be located in the horizontal portion thereof. The latches 66 are secured to the lower ends of respective depending spring members 68 which are attached at their opposed ends to the cover plate 26. The springs act to normally urge the latches 66 into the openings 67. Extending through the vertical portions of the openings 67 and through the spring members 68 is a rod 69. The rod 69 is attached to each of the spring members 68 and has an end portion 70 extending through one side wall 25 and serves as means whereby the rod 69 may be manually pushed inwardly to move the spring member 68 and consequently cause the latches 66 to be moved out of the openings 67. This will release the optical assembly unit 22 and permit it to be lowered as shown in dot-dash lines in Figs. 2 and 4. A coil spring 71 (Fig. 4) is connected at one end to the base portion 63 of the cradle 59 and at its other end to the side wall 25 of the supporting member 21 and serves to ease the downward movement of the housing 56. A stop 72 is provided at the bottom of the rear opening 29 of the supporting member 21 for limiting the extent of downward movement of the housing 56 and for locating the optical assembly unit 22 in desired lowered position for performing the near-vision tests, and a similar stop 72a is provided on the upper edge of the opening 29 for locating the optical assembly unit 22 in its uppermost position as shown by full lines in Figs. 2 and 4 for performing the far-vision tests.

In the front end of the housing 56 of the optical assembly unit 22 are provided a pair of sight openings 73 (Figs. 1 and 3) and a recess 74 is provided for the nose of the individual undergoing the test. The individual is required to position his forehead against the brow rest 47 which is adjustable, as described hereinbefore, to regulate the distance of the individual's eyes from the sight openings 73. In the sight openings 73 are located clear transparent members 75 which prevent foreign matter from entering the housing 56 through the openings 73.

Figure 7:
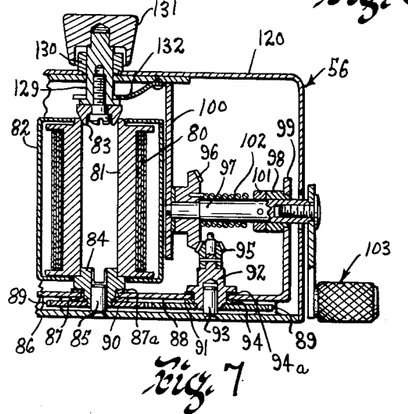
Fig. 7 is a fragmentary vertical sectional view taken substantially on line 7—7 of Fig. 5 looking in the direction of the arrows.

Positioned inwardly of the housing 56, beneath each of the sight openings 73, is a turntable 76 on each of which is eccentrically located a lens system 77 comprising a casing 78 containing a pair of sphero-prism lenses 79, which lenses 79 are preferably achromatic. Each of the lens systems 77 is adapted to be substantially aligned with the openings 73 whereby the individual being tested can view therethrough to a target which is in the form of a strip film 80 carried by a spool 81 mounted in a canister 82. The canister 82 containing the film 80 is substantially square in horizontal cross-section, as shown in Fig. 3, and the upper and lower ends of the canister 82 have openings therein whereby a locating member 83 can be inserted through the upper opening (Fig. 7) and into engagement with the upper end of the spool 81, and a slotted member 84 can be inserted through the lower opening and keyed with the lower end of the spool 81. The slotted member 84 is rotatably mounted on a pin 85 which is carried by the base 86 of the housing 56 and is rotatable between friction washers 87 and 87a in a supporting plate 88 which is carried as by legs 89 on the base 86. The lower end of the slotted member 84 carries a gear 90 which is in mesh with a gear 91 mounted on the lower end of hub 92 which is rotatably mounted on a pin 93 carried by the base 86 and within a second set of friction washers 94 and 94a mounted in the plate 88. The upper end of the hub 92 has pinned or otherwise secured thereto a bevelled gear 95 which is in mesh with a bevel gear 96. The gear 96 is freely mounted on one end of a shaft 97, which shaft 97 is rotatably supported at one end in a bushing 98 carried by an upright portion 99 of the plate 88 and at the other end in a plate 100 which depends from the top of the housing 56.

The outer end of the shaft 97 has a collar 101 pinned or otherwise connected thereto adjacent the bushing 98, with a coil spring 102 being mounted on the shaft 97 between the collar 101 and gear 96. The spring 102 is a loose contact fit with the cylindrical surface of shaft 97 and has one end connected to the gear 96. Rotation of the shaft 97 in one direction will cause the spring 102 to unwind and slip on the shaft, while rotation of the shaft 97 in the other direction will cause the spring 102 to tighten and thus drive the gear 96. The spool 81 carrying the film 80 may rotate in one direction as the film 80 is unwound therefrom, which will cause rotation of slotted member 84, gears 90 and 91, hub 92, and gears 95 and 96, whereupon the spring 102 will rotate freely about the shaft 97. However, to rotate the spool 81 in the opposite direction to wind the film 80 thereupon, there is provided on one end of the shaft 97 an operating handle 103 which can be grasped by the operator of the device and rotated in the proper direction. Such rotation of the shaft 97 will cause the spring 102 to bind itself upon the shaft 97 and consequently cause rotation of gear 96 through which gear 95, hub 92, gears 90 and 91, and slotted member 84 will also be made to rotate. Such rotative movement will, therefore, be transmitted to the spool 81 whereupon the film 80 can be rewound thereupon.

Figures 8, 10:
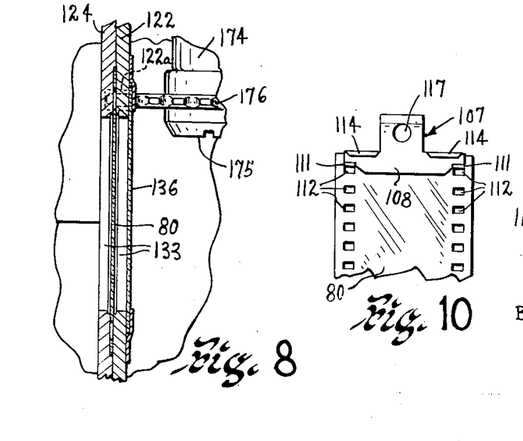
Fig. 8 is an enlarged fragmentary view partly in section of the means for locating the targets in proper testing positions.
Fig. 10 is a view generally similar to Fig. 9 showing the clip attached to the film.
Figure 9:
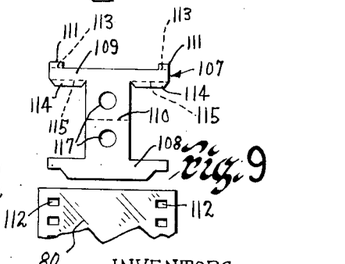
Fig. 9 is an enlarged view illustrating one end of a film and showing adjacent thereto an unattached clip for connecting the film to a spool.

The canister 82 containing the film 80 is adapted to be positioned in a compartment 104 (Fig. 3) provided therefor in the rear portion of the housing 56 at one side thereof, and a similar compartment 105 is located in the opposed side of the housing 56 in which is located a second spool 106. The film 80 may be drawn out of the canister 82 through a slot 82a having pads or brushes 82b attached at either side thereof to clean the film as it passes therethrough. The film is extended across the interior of the housing 56 over a roller 105a into the compartment 105 and is connected to the spool 106 by an H-shaped connector 107 (Figs. 9 and 10) formed of pliable metal which is initially formed, as shown in Fig. 9. The arm portions 108 and 109 of the connector 107 are superimposed upon opposite surfaces of the film 80 at the end thereof, as shown in Fig. 10, by bending the connector 107 along dotted line 110. Tabs 111, formed on the outer side of the arm portion 109 adjacent its ends, are extended through openings 112 in the film 80 by bending along dotted lines 113 and lapped over the opposed arm portion 108. Then, a pair of tabs 114, on the opposed side of the arm portion 109 are bent along dotted lines 115 so as to overlie the end of the film 80 and the adjacent outer surface of arm portion 108. This will firmly secure the connector 107 to the film 80. To connect the film 80 to the spool 106, there is provided a screw stud 116 (Fig. 3) on which the connector 107 is attached as by hole 117.

The spool 106 is mounted on a shaft 118 and held thereupon by a set screw 119. The ends of the shaft 118 are rotatably located in bushings 118a carried by the top plate 120 and bottom plate 86 of the housing 56. The upper end of the shaft 118 extends through the top plate 120 and has attached thereto a knob 121 by which the spool 106 can be manually rotated to wind the film 80 thereupon.

The spool 81 can be easily removed by lifting the locating member 83 out of the upper end of the opening in the spool 81. The locating member 83 is screwed or otherwise attached to a shaft 129 (Figs. 5 and 7) which extends upwardly through a bushing 130 mounted on the top 120 of the housing 56 and carries a knob 131 thereon. A spring 132 attached to the top 120 engages the shaft 129 and urges it in a direction toward the spool 81. Thus the spool 81 is retained in desired position at all times unless the knob 131 is manually pulled out against the tension of the spring 132.

Extending across the interior of the housing 56, between the front ends of the compartments 104 and 105, is a plate 122 which is secured in place by angles 123 which are screwed, soldered, or otherwise attached to the top 120 and bottom 86 of the housing 56. A second plate 124 is similarly fitted in the housing 56 and is spaced slightly forward of the plate 122. The film 80, in extending from the spool 81 to the spool 106, passes between the plates 122 and 124 as shown in Figs. 2 and 3. To provide ease in loading the film 80, the housing 56 is preferably broken in the area between the plates 122 and 124 to form a front housing 56a and a rear housing portion 56b which housing portions are connected at the bottom by a hinge 125. The front housing portion 56a is preferably provided with a flange 126 on the top and sides thereof, which flange 126 is adapted to overlie the adjacent edge of the rear housing portion 56b as a dust seal. To locate the housing portions in closed relation there is provided a shaft 127 (Fig. 3) which extends forwardly through the rear housing portion 56b and is supported therein as by lugs 127a provided on the under surface of the top 120, which shaft 127 has a knob 128 secured to its outer end and which has its front end passing through plate 122 and threadedly attached to the plate 124 which is mounted in the rear end of the front housing portion 56a and which is adapted to be placed in superimposition with plate 122 when the housing portions are closed. Thus, the rear housing portion 56b can be easily opened to load or remove the film 80 by merely disconnecting the threaded portion of the shaft 127 from the plate 124.

The plates 122 and 124 are provided with aligned pairs of spaced left eye and right eye apertures 133 and 134 respectively, through which portions of the film 80 are visible to the individual viewing through the lens systems 78. Substantially centrally located in the rear housing portion 56b is a lamp 135 which functions to direct light both directly and by reflector 135a through diffusing and filter plates 136 and 137 (Figs. 2, 3 and 8) mounted on the adjacent side of plate 122 over the apertures 133 and 134, onto the film 80. Thus the film is rendered clearly visible to the viewer.

Figure 5:
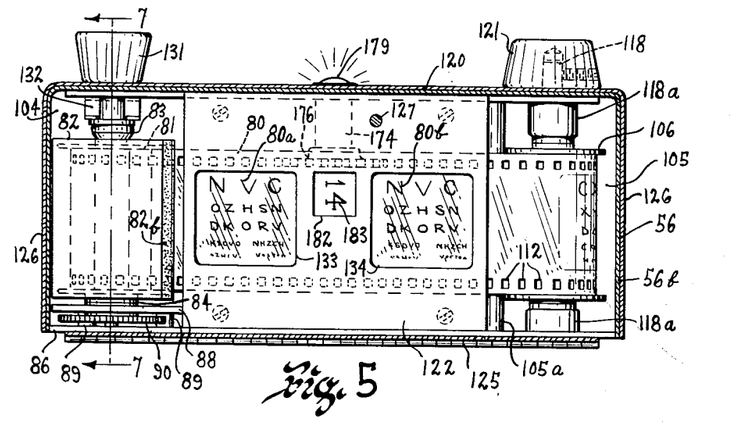
Fig. 5 is a vertical sectional view taken substantially on line 5—5 of Fig. 2 looking in the direction of the arrows.

The film 80 is provided with any desirable layout of test charts such as shown in Fig. 5, which charts are required to be examined by the individual being tested. The test charts are arranged in pairs on the film 80 and are adapted to be aligned with the apertures 133 and 134 for accomplishing the various tests, both binocular and monocular. To provide monocular viewing, the device has left and right eye occluders 138 and 139 respectively (Figs. 2 and 3) which are supported upon a shaft 140, the shaft 140 extending transversely of the housing 56 and being rotatably supported in bearings 141 carried by the opposed side walls of the housing 56. Mounted upon the shaft 140 in end-to-end arrangement are a pair of sleeves 142 and 143, sleeve 142 being pinned by member 144 to the shaft 140 for rotation therewith. Sleeve 143 is freely rotatable on the shaft 140 and independent thereof. Each occluder 138 and 139 is provided with a respective right-angled portion 138a and 139a (Fig. 2) which is bent around respective sleeves 144 and 145 and are soldered or otherwise fixedly attached thereto. The sleeves 144 and 145 are mounted upon and attached to the respective sleeves 142 and 143 for rotation therewith. An operating lever 146 is attached to the outer end of sleeve 143 over the shaft 140, and a second operating lever 147 is secured to the end of the shaft 140. Thus, operation of lever 147 will rotate shaft 140 and consequently sleeves 142 and 144, whereby the occluder 138 will swing upwardly or downwardly about the axis of shaft 140. Operation of lever 146 will cause rotation of sleeves 143 and 145 independently of the shaft 140 to swing the occluder 139. The relative positions of levers 146 and 147 are so designed as to permit individual or simultaneous operation of the occluders.

Elongated flat springs 148 and 149 are fixedly attached to respective portions 150 and 151 of the rear wall of the housing portion 56a and extend upwardly into engagement with square-sided blocks 152 and 153 mounted on respective sleeves 144 and 145 adjacent the outer ends thereof. Thus, the action of the springs 148 and 149 upon the blocks 152 and 153 will tend cause the occluders to be retained in either a downwardly extending occluding position as shown by dot-dash lines in Fig. 2, or in horizontally extending position normal to the occluding position.

The lenses 79 of the present invention are preferably achromatic, as has been stated above, and to provide this characteristic they are formed as doublets comprised of an ophthalmic crown glass element 154 (Fig. 16) having an index of refraction of approximately 1.523 and a flint glass element 155 having an index of refraction of approximately 1.6165. The element 154 is provided with spherical plus curves on each side thereof of about 96.4 m./m. radius. The element 155 is formed plano on one side and has a minus curve of about 96.4 m./m. radius on its opposed side, the minus curved surface being cemented to one side of the element 154. Each lens element 77 is comprised of two identical doublets of the above character arranged with their plano surfaces 156 directed outwardly, and with air spacing of approximately one m./m. between inner apices.

It is known that in an optical system embodying a given eye-to-target distance, as in the present invention, a lens system can be inserted between said eye and target at not more than two different points where the target will have the same angular size as seen by a viewer. However, the lens system will form images when located at each point, which images will differ considerably in location.

Figures 15, 16, 17:
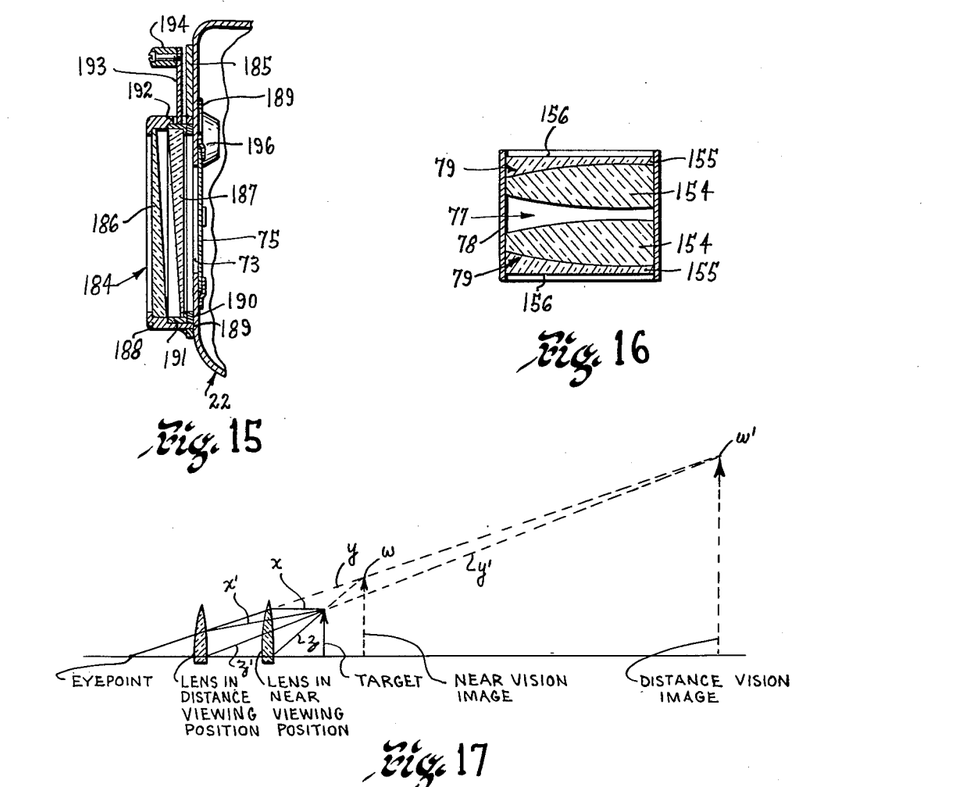
Fig. 15 is an enlarged vertical sectional view taken substantially on line 15—15 of Fig. 13 and looking in the direction of the arrows.
Fig. 16 is an enlarged horizontal sectional view through a lens unit.
Figs. 17, 18 and 19 are diagrammatic illustrations of the optical system as used for both far and near vision tests.

This is indicated in Fig. 17 of the drawings wherein an eye point and a target are located substantially on a common optical axis. By eye point is meant plane of entrance pupils of the eyes. By inserting a lens between the target and the eye point, a visual image is apparent to the viewer whose eye is located at said eye point which image is magnified as indicated by the dotted lines. By adjusting the lens system to either of two different points on the optical axis, two images may be formed, one of which will be apparently formed at near vision or reading distance (14 inches, for example) and the other will be apparently formed effectively at infinity (26 feet).

In accordance with the present invention, the optics of the device comprise a pair of lenses located at a known distance from the viewer's eyes and also at a known distance from the target or test charts 80a and 80b, with the targets 80a and 80b being located at a fixed distance from the eyes. In the presently described instrument, the lens system 77 can be located at either of the two positions by mounting each lens system 77 on a turntable 76 as described hereinbefore. The turntables 76 are mounted on a platform 157 (Figs. 2 and 3) for rotation on ball bearings 158 about a central pivot 159. The pivot 159 is located at a point midway between the eye point and the target. When the turntables 76 are located in the positions illustrated by full lines in the drawings, the lens systems 77 are in distance viewing positions. It is apparent that rotation of the turntables 76 one hundred and eighty degrees from the positions shown will position the lens systems 77 at an equal distance from the pivot 159 on the opposite side thereof and in near viewing positions.

The lenses 79 of the lens sysems 77 are constructed and arranged dimensionally in accordance with the selected focal length whereby the desired image locations for near and distance viewing are established while maintaining a selected constant angular magnification. This is indicated in Fig. 17 wherein assuming that the lens is in near viewing position at a controlled distance from the target, a ray of light passing from the tip of the arrowhead on the target, for example, will pass substantially along the path indicated by full line $x$ to the eyepoint which is located on the axis of the system. The individual viewing the target through the lens, when in this position, will apparently view the tip of the arrowhead of the image along line $y$. An extension of a line $z$ which passes from the second principal point of the lens through the tip of the arrowhead of the image will intersect line $y$ at point $w$. This will establish, in the presently described system, the size and location of the image for near viewing. Similarly, when the lens is in distance viewing position, a line $x'$ passing from the tip of the arrowhead of the target indicates the path of a light ray from said tip of the arrowhead through the lens to the eyepoint. The viewer will still apparently view the tip of the arrowhead along line $y$. A line $z'$ passing from the second principal point of the lens, when in this position, through the tip of the arrowhead of the image, when extended as indicated by dotted line $y'$ will intersect line $y$ at point $w'$ and will establish the size and location of the image for distance viewing.

Figure 18:
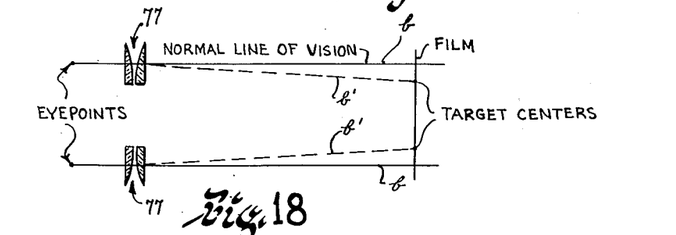
Figure 19:
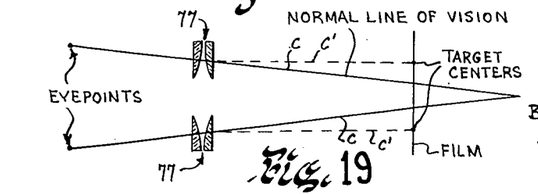

Also to be noted is that the lenses 79 of one of the lens systems 77, when in distance viewing positions, are arranged with their thickest portions directed toward the opposed lens systems 77. When the turntables 76 are rotated, the lens systems 77 will also be rotated which will cause the optical centers of the lenses 79 to move toward or away from one another. This is due to the fact that each lens system 77 is mounted eccentrically upon its respective turntable 76. In each viewing position, the lenses must introduce the proper prism effect so that the left and right eye images coincide. The transverse motion of the optical centers of the lenses toward and away from each other produces a change in prism effect that corresponds with the longitudinal motion of the target images from distance to near or near to distance positions. For example, referring to Fig. 18 of the drawings, it will be noticed that for distance viewing, the eyes of a viewer will normally view along substantially parallel lines $b$—$b$, as indicated by full lines. However, for near viewing, the eyes will normally converge as indicated by the full lines $c$—$c$ in Fig. 19. Therefore, in order to cause the right and left eye target images to be superimposed for both the far and near distance tests, the target centers have been arranged to be located substantially as indicated in both Figs. 18 and 19 whereupon light rays from the target centers will pass to the lenses along the dotted lines $b'$—$b'$ and $c'$—$c'$ and the individual will appear to see the targets along the full lines as in normal viewing. It is to be understood, of course, that the lens systems are designed so that when they are located in the respective base-in or base-out positions, the individual will view in the desired manner. It will also be noted that the angle between the lines of normal vision and the lines of adjusted vision in the distance view diagram (Fig. 18) is substantially the same as the angle between the normal lines of vision and the adjusted lines of vision in the near viewing diagram (Fig. 19).

By turning the lenses around, when adjusting them from one position to the other, the same glass area is used in both cases. This reduces the size of the lens that is needed and eliminates mechanical interference between the lenses which would occur if the lenses were to slide or otherwise be moved from one position to the other.

As has been stated above, the optical assembly unit 22 is dropped to the position shown by dotted lines in Figs. 3 and 4 when it is desired to adjust from distance viewing to near viewing. Such movement of the housing 56 automatically and simultaneously adjusts the lens systems 77, and the mechanism for accomplishing this embodies a downwardly extending arm 160 provided on each lever 58. The arms 160 carry therebetween a transversely extending shaft 161. Between the bottom plate 86 and the table 157 which carries the turntables 76 are a pair of slide members 162 each of which is provided with an arm 163 which extends downwardly through openings 164 in the bottom plate 86 and base portion 63 of the cradle 59. The end of each arm 163 is recessed as indicated at 164 and engages the shaft 161 adjacent its opposed ends.

It will be noted that when the device is in raised or distance vision testing position the vertical plane of the shaft 161 is located slightly to the rear of the corresponding vertical plane of the pivots 62 of levers 58. However, as the housing 56 is lowered, the levers 58 will rotate about the pivots 62 as described, which will cause the shaft 161 to swing downwardly and forwardly about the center 65 (Figs. 2 and 4). This forward movement of the shaft 161 will cause the arms 163 to move forwardly with slide members 162. The slide members 162 are provided with longitudinal slots 165 in each of which is located a fixed pin 166 carried by the bottom plate 86 for guiding the slide members 162 as they move.

Rods 167 extending from the forward ends of each slide member 162 have pivotally attached thereto at 168 one end of respective levers 169, which levers 169 are pivotally attached at 170 to the bottom plate 86 and are provided on their opposite ends with gear segments 171 which are in mesh with pinions 172 carried by the pivots 159 of the turntables 76. Spring devices 167a are mounted on the rods 167 on each side of the pivotal connections 168 to cushion the movements of parts of the device. Thus, as the slide members 162 are caused to move forwardly when the housing 56 is lowered, the levers 169 will rotate about pivots 170 and, through gear segments 171 and pinions 159 will cause the turntables 76 and lens systems 77 to rotate one hundred and eighty degrees to the near vision testing positions. Likewise, raising of the housing 56 will cause reverse movements of the parts of the mechanism whereby the lens systems 77 will be automatically positioned in distance vision testing positions.

It is to be understood that properly constructed and arranged light baffles 173 (Fig. 3) are positioned in the housing to confine viewing of the targets to those portions thereof which are designed to be viewed by the respective eyes during viewing.

Means is also provided for accurately aligning the pairs of test charts 80a—80b with the openings 133—134 and comprises a block 174 (Figs. 2, 3, 5 and 8) which is secured to the top plate 120 of the rear housing portion 56b and which threadedly carries a vertically extending headed stud 175. On the stud 175 between the head thereof and the block 174 is rotatably mounted a sprocket 176 a portion of which is extended through a slot 122a (Fig. 8) in the rear plate 122 and engages the perforations 112 in one side of the film 80. Secured to one side of the block 174 is a switch 177 (Fig. 2) the operating member 178 of which is constantly spring-urged into engagement with the sprocket 176. The sprocket 176 is provided with a series of detents each of which are adapted to be engaged by the member 178 of the switch 177 when a pair of test charts 80a—80b are accurately located in testing position. The switch 177 is normally closed so that as the operating member 178 thereof rides on the surface of the sprocket 176 between the detents, the member 178 will be in raised position to open the switch 177. The switch 177 is electrically connected to the lamp 135 so that the film 80 will be illuminated only when a set of the targets 80a—80b is properly located in testing position, whereupon the operating member 178 will be positioned in a corresponding detent and the lamp 135 consequently lighted. A lens 179 is held by retaining means 180 over an opening in the top plate 120 above the lamp 135 to visually indicate to the operator of the device when the lamp 135 is lighted and, consequently, when a set of test targets 80a—80b are located in testing position.

Means also is provided for visually indicating to the operator which particular set of test targets 80a—80b is in testing position, and comprises a prism 181 which extends vertically within the rear end of the front housing portion 56a. The lower portion of the prism 181 is aligned openings 182 in the plates 122 and 124, the openings 182 being smaller than and located between the target openings 133—134 whereby an image of a numeral 183 or similar indication on the film 80 between each left and right eye target 80a—80b of a pair thereof, and which is aligned with the openings 182 when the set of targets is located in testing position, will be visible to the operator in the upper end of the prism 181, as seen in Fig. 4.

Such an illuminated indexing system permits an operator to tell, even under conditions of low room illumination, the number of the test target being exposed to the view of the individual being tested.

Figure 13:
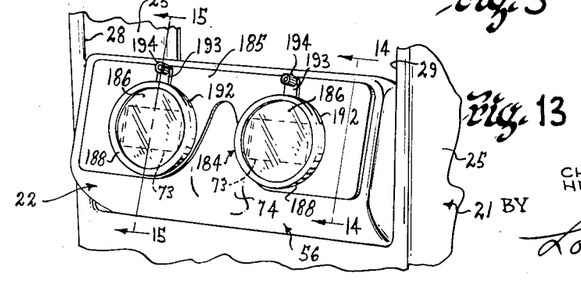
Fig. 13 is a fragmentary front perspective view of the optical assembly unit.
Figure 14:
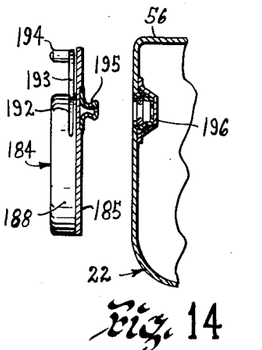
Fig. 14 is an enlarged vertical sectional view taken substantially on line 14—14 of Fig. 13 looking in the direction of the arrows.

An antimalingering device 184 (Figs. 13, 14 and 15) is also provided and comprises an apertured supporting plate 185 which carries a pair of prism lenses 186—187 (Fig. 15) over each of the apertures therein. A circular frame 188 mounted over each aperture has a rearwardly directed flange 189 which interfits with the respective apertures. The front prism lenses 186 are fixedly mounted in the frames 188 while the rear prism lenses 187 are positioned in rims 191 rotatably mounted in the frames 188 and retained therein as by a ring member 190. A slot 192 is provided in the upper portion of each frame 188 through which extends a handle 193 which is attached to the rim member 191. By grasping a knob 194 on each handle 193, the operator can easily rotate the rear prism lenses 187.

On the rear surface of the supporting plate 185 are located the male portions 195 of a snap fastener, the female portions 196 thereof being carried in the front wall of the housing 56. Thus, the antimalingering devices 184 or other desired devices may be located in position before the eyes of a viewer being tested.

From the foregoing description, it will be seen that an improved vision testing device has been provided which is compact, light in weight, and efficient in its use.

It is apparent that all of the objects and advantages of the invention have been accomplished. It will also be apparent, however, that changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

We claim:

1. An eye testing device of the character described comprising a base and a housing carried by said base, said housing having sight openings therein at one end and having a wall portion therein spaced from said sight openings, carrier means for alternately positioning a succession of test target means in openings in the wall portion, lens means carried by said housing and adjustable from one position in the line of vision between said sight openings and said wall portion where said means are effective for projecting said test target means visible therethrough at infinity to a second position in said line of vision where they are effective for rendering said target means visible at near vision distance, said housing being angularly adjustable on said base about a predetermined center located adjacent the normal position of viewing the test target means to selected positions where a patient viewing said test target means through said sight openings will view along lines of vision simulating lines of vision normally assumed for near and infinity viewing, mounting means movably connecting said housing to said base whereby said angular adjustment of said housing is accomplished, and control means operably connecting said lens means with said mounting means causing said lens means to move into said first mentioned position simultaneously with the movement of said housing into selected angular adjusted position for infinity viewing and to move into the second position simultaneously with movement of the housing into angular adjusted position for near viewing.

2. An eye testing device of the character described comprising a base, spaced uprights on said base, a supporting frame vertically adjustable on said uprights, and a housing carried by said supporting frame and movable therewith on said uprights, said housing having sight openings therein at one end and having a wall portion therein spaced from said sight openings, carrier means for alternately positioning a succession of test target means in openings provided in the wall portion, lens means adjustably carried by said housing in the line of vision between said sight openings and said wall portion, said lens means being adjustable from one position in said line of vision where they are effective for projecting said test target means visible therethrough at infinity and to a second position in said line of vision where they render the test target means visible at near vision distance, said housing being angularly adjustable on said supporting frame about a predetermined center to a pair of positions whereby a patient viewing said test target means through said sight openings will view along lines of vision simulating lines of vision normally assumed for near vision when the housing is at one position and for infinity viewing when at the other position, mounting means movably connecting said housing to said supporting frame whereby said angular adjustment of said housing to said two positions is accomplished, and control means operably connecting said lens means with said mounting means for moving said lens means into one of said selected adjusted positions simultaneously with the movement of said housing into a corresponding selected adjusted position.

3. An eye testing device of the character described comprising a base, spaced uprights on said base, a supporting frame vertically adjustable on said uprights, and a housing connected by lever means to said supporting frame and movable therewith on said uprights, said housing having sight openings therein at one end and having a wall portion therein spaced from said sight openings, carrier means for alternately positioning a succession of test target means in openings provided in the wall portion, lens means adjustable from one position in the line of vision between said sight openings and said wall portion for effectively projecting said test target means visible therethrough at infinity to a second spacer position in said line of vision for rendering the test target means visible at near vision distance, said lever means connecting said housing to said supporting frame being such that said housing may be angularly adjusted on said supporting frame about a predetermined center to a pair of positions whereby a patient viewing said test target means through said sight openings will view along lines of vision simulating lines of vision when the housing is in one position normally assumed for near vision and for infinity viewing when it is in the other position and control means operably connecting said lens means with said lever means for moving said lens means from one selected adjusted position to the other in accordance with the movement of said housing into its selected adjusted positions for near distance and infinity viewing.

4. An eye testing device of the character described comprising a base, spaced uprights on said base, a supporting frame vertically adjustable on said uprights, and a housing connected by lever means to said supporting frame and movable therewith on said uprights, said housing having sight openings therein at one end and having a wall portion therein provided with a pair of target openings spaced from said sight openings, carrier means for alternately positioning a succession of test target means in said target openings in the wall portion, lens means adjustable in the line of vision between said sight openings and said wall portion from one position for effectively projecting said test target means visible therethrough at infinity and to a second position in said line of vision for effectively projecting the test target means at near vision distance, said lever means connecting said housing to said supporting frame being such that said housing may be angularly adjusted on said supporting frame about a predetermined center whereby a patient viewing said test target means from adjacent said center through said sight openings will view along lines of vision simulating lines of vision normally assumed for near vision and infinity viewing, and control means operably connecting said lens means with said lever means for moving said lens means into selected adjusted position simultaneously with the movement of said housing into selected adjusted position, said control means comprising a pair of turntables on which said lens means are respectively eccentrically mounted, and operating mechanism connected with said turntables and with said lever means for automatically causing rotation of said turntables substantially one hundred and eighty degrees upon movement of said lever means when said housing is adjusted to selected angular position, whereby said lens means will be automatically moved from one position in the line of vision from the sight opening to the test target means into a second adjusted spaced position in said line of vision with respect to said test target means.

5. An eye testing device of the character described comprising a base, spaced uprights on said base, a supporting frame vertically adjustable on said uprights, adjusting means for positioning said supporting frame on said uprights in desired spaced relation with said base comprising pinion means carried by said supporting frame and functioning cooperatively with a rack carried by said uprights, operating means for manually controlling said pinion means and comprising a clutch device for permitting manual operation of said pinion means and preventing accidental displacement of said supporting frame from selected adjusted position, and a housing connected by lever means to said supporting frame and movable therewith on said uprights, said housing having sight openings therein at one end and having a wall portion therein spaced from said sight openings, carrier means for alternately positioning a succession of test target means in openings in the wall portion, lens means carried by said housing and adjustable from one position in the line of vision between said sight openings and said wall portion for effectively projecting said test target means visible therethrough selectively at infinity to a second position in said line of vision for rendering the test target means visible at near vision distance, said housing being angularly adjustable on said supporting frame through said lever means about a predetermined center whereby a patient viewing said test target means from a location adjacent said center through said sight openings and lenses will view along lines of vision simulating lines of vision normally assumed for near vision and infinity viewing, and control means operably connecting said lens means with said lever means for moving said lens means from one selected adjusted position to the other in accordance with the movement of said housing into its selected adjusted positions for near distance and infinity viewing.

6. An eye testing device of the character described comprising a base, spaced uprights on said base, a supporting frame vertically adjustable on said uprights, adjusting means for positioning said supporting frame on said uprights in desired spaced relation with said base comprising pinion means carried by said supporting frame and functioning cooperatively with a rack carried by said uprights, operating means for manually controlling said pinion means and comprising a clutch device for permitting manual operation of said pinion means and preventing accidental displacement of said supporting frame from selected adjusted position, and a housing carried by said supporting frame and movable therewith on said uprights, said housing having sight openings therein at one end and having a wall portion therein spaced from said sight openings, carrier means for alternately positioning a succession of test target means in openings in the wall portion lens means adjustably carried by said housing and adjustable from one position in the line of vision between said sight openings and said wall portion for effectively projecting said test target means visible therethrough selectively at infinity and to a second spaced position in said line of vision for rendering the test target means visible at near vision distance, said housing being angularly adjustable on said supporting frame about a predetermined center whereby a patient viewing said test target means from adjacent said center through said sight openings and lenses will view along lines of vision simulating lines of vision normally assumed for near vision and infinity viewing, mounting means movably connecting said housing to said supporting frame whereby said angular adjustment of said housing is accomplished, control means operably connecting said lens means with said mounting means for moving said lens means from one selected adjusted position to the other in accordance with the movement of said housing into its selected adjusted positions for near distance and infinity viewing, and locking means for retaining said supporting frame in at least one selected adjusted position on said uprights.

7. An eye testing device of the character described comprising a base, and a housing carried by said base, said housing having sight openings therein at one end and having a wall portion therein spaced from said sight openings, means for alternately positioning a succession of test target means in openings in the wall portion, said means comprising compartments in said housing each of which is adapted to receive a respective film spool, and manual control means extending into said compartments for engagement with a respective spool therein whereby the respective spools may be individually rotated to wind a film thereupon from the other of said spools, lens means carried by said housing and positionable at a pair of spaced positions in the line of vision between said sight openings and said wall portion for effectively projecting said test target means visible therethrough selectively at infinity and at near vision distance, said housing being angularly adjustable on said base about a predetermined center whereby a patient viewing said test target means from a location adjacent said center through said sight openings and lenses will view along lines of vision simulating lines of vision normally assumed for near and infinity viewing, mounting means movably connecting said housing to said base whereby said angular adjustment of said housing is accomplished, and control means operably connecting said lens means with said mounting means for moving said lens means from one selected adjusted position to the other in accordance with the movement of said housing into its selected adjusted positions whereby when the housing is angularly adjusted for near distance or infinity viewing the lens means will be in required position for viewing.

8. An eye testing device of the character described comprising a base, and a housing carried by said base, said housing having sight openings therein at one end and having a wall portion therein spaced from said sight openings, means for alternately positioning a succession of test target means in openings in the wall portion, said means comprising compartments in said housing each of which is adapted to receive a respective film spool, manual control means extending into said compartments for engagement with a respective spool therein whereby the respective spools may be individually rotated to wind a film thereupon from the other of said spools, manual aligning means extending into said housing for aligning targets formed on said film with said openings in the wall portion, illuminating means in said housing rearwardly of the wall portion for directing light through said test target means, switch means connected with said illuminating means and operable by said aligning means for causing said illuminating means to function only when said test target means are aligned with said openings in the wall portion, lens means rotatably connected with said housing and movable to a pair of positions in the line of vision between said sight openings and said wall portion for effectively projecting said test target means visible therethrough selectively at infinity and at near vision distance, said housing being angularly adjustable on said base about a predetermined center whereby a patient viewing said test target means through said sight openings and lenses will view along lines of vision simulating lines of vision normally assumed for near and infinity viewing, mounting means movably connecting said housing to said base whereby said angular adjustment of said housing is accomplished, and control means operably connecting said lens means with said mounting means for rotating said lens means into said pair of positions in response to the movement of said housing from one of its selected adjusted positions to the other for near distance and infinity viewing.

9. An eye testing device of the character described comprising a base, and a housing carried by said base, said housing having sight openings therein at one end and having a wall portion therein spaced from said sight openings, means for alternately positioning a succession of test target means in openings in the wall portion, said means comprising compartments in said housing each of which is adapted to receive a respective film spool, manual control means extending into said compartments, for engagement with a respective spool therein whereby the respective spools may be individually rotated to wind a film thereupon from the other of said spools, manual aligning means extending into said housing for aligning targets formed on said film with said openings in the wall portion, illuminating means in said housing rearwardly of the wall portion for directing light through said test target means, occluding means mounted on said housing and movable into and out of the line of vision between said sight openings and said openings in the wall portion, lens means carried by said housing and adjustable to a pair of positions in the line of vision between said sight openings and said wall portion, one of said positions being for effectively projecting said test target means visible therethrough selectively at infinity and the other for rendering said test target means visible at near vision distance, said housing being angularly adjustable on said base about a predetermined center whereby a patient viewing said test target means through said sight openings will view along lines of vision simulating lines of vision normally assumed for near and infinity viewing, mounting means movably connecting said housing to said base whereby said angular adjustment of said housing is accomplished, and control means operably connecting said lens means with said mounting means for moving said lens means from one selected adjusted position under the control of the movement of said housing into one selected adjusted position and for moving said lens means to its other selected adjusted position when said housing is moved to its other adjusted position.

10. An eye testing device of the character described comprising a base, spaced uprights on said base, a supporting frame vertically adjustable on said uprights, adjusting means for positioning said supporting frame on said uprights in desired spaced relation with said base comprising pinion means carried by said supporting frame and functioning cooperatively with a rack carried by said uprights, operating means for manually controlling said pinion means and comprising a clutch device for permitting manual operation of said pinion means and preventing accidental displacement of said supporting frame from selected adjusted posiltion, and a housing carried by said supporting frame and movable therewith on said uprights, said housing having sight openings therein at one end and having a wall portion therein spaced from said sight openings, carrier means for alternately positioning a succession of test target means in openings in the wall portion, a pair of rotatable turntables mounted in said housing for supporting lens means in the line of vision between said sight openings and said wall portion, said lens means being adapted for effectively projecting said test target means visible thereto selectively at infinity and at near vision distance according to their related positions in said line of vision, and the diameter of said turntables being such that by rotation through 180 degrees the lens means may be adjusted between said positions in the line of vision for near distance and for infinity viewing, lever means connecting said housing to said supporting frame whereby said housing may be agularly adjusted on said supporting frame about a predetermined center to allow a patient to selectively view said test target means through said sight openings along lines of vision simulating lines of vision normally assumed for near vision and infinity viewing, and operating mechanism connected with said turntables and with said lever means for automatically causing rotation of said turntables substantially one hundred and eighty degrees upon movement of said lever means when said housing is adjusted to selected angular positions for near distance and infinity viewing, whereby said lens means will be automatically moved into selected adjusted spaced relation with respect to said test target means.

11. An eye testing device of the character described comprising a base, and a housing carried by said base, said housing having sight openings therein at one end and having a wall portion therein spaced from said sight openings, means for alternately positioning a succession of test target means in openings in the wall portion, said means comprising compartments in said housing each of which is adapted to receive a respective film spool, manual control means extending into said compartments for engagement with a respective spool therein whereby the respective spools may be individually rotated to wind a film thereupon from the other of said spools, manual aligning means extending into said housing for aligning targets formed on said film with said openings in the wall portion, lens means carried by said housing and positionable in a pair of spaced positions in the line of vision between said sight openings and said wall portion for effectively projecting said test target means visible therethrough selectively at infinity and at near vision distance, said housing being angularly adjustable on said base about a predetermined center whereby a patient viewing said test target means from a location adjacent said center through said sight openings and lenses will view along lines of vision simulating lines of vision normally assumed for near and infinity viewing, mounting means movably connecting said housing to said base whereby said angular adjustment of said housing is accomplished, and control means operably connecting said lens means with said mounting means for moving said lens means from one selected adjusted position to the other in accordance with the movement of said housing into its selected adjusted positions for near distance and infinity viewing.

12. An eye testing device of the character described comprising a base, and a housing carried by said base, said housing having sight openings therein at one end and having a wall portion therein spaced from said sight openings, means for alternately positioning a succession of test target means in openings in the wall portion, said means comprising compartments in said housing each of which is adapted to receive a respective film spool, manual control means extending into said compartments for engagement with a respective spool therein whereby the respective spools may be individually rotated to wind a film thereupon from the other of said spools, manual aligning means extending into said housing for aligning targets formed on said film with said openings in the wall portion, illuminating means in said housing rearwardly of the wall portion for directing light through said test target means, lens means carried by said housing and adapted to be located in a pair of spaced positions in the line of vision between said sight openings and said wall portion, one of said positions being for effectively projecting said test target means visible therethrough selectively at infinity and the other for rendering said test target means visible at near vision distance, said housing being angularly adjustable on said base about a predetermined center whereby a patient viewing said test target means from a location adjacent said center through said sight openings and lenses will view along lines of vision simulating lines of vision normally assumed for near and infinity viewing, mounting means movably connecting said housing to said base whereby said angular adjustment of said housing is accomplished, and control means operably connecting said lens means with said mounting means for moving said lens means from one selected adjusted position to the other in accordance with the movement of said housing into its selected adjusted positions for near distance and infinity viewing.

13. An eye testing device of the character described comprising a base, spaced uprights on said base, a supporting frame vertically adjustable on said uprights, adjusting means for positioning said supporting frame on said uprights in desired spaced relation with said base comprising pinion means carried by said supporting frame and functioning cooperatively with a rack carried by said uprights, operating means for manually controlling said pinion means and comprising a clutch device for permitting manual operation of said pinion means and preventing accidental displacement of said supporting frame from selected adjusted position, and a housing carried by said supporting frame and movable therewith on said uprights, said housing having sight openings therein at one end and having a wall portion therein spaced from said sight openings, carrier means for alternately positioning a succession of test target means in openings in the wall portion, a pair of turntables pivotally supported in said housing before the sight openings, lens means mounted on each turntable, said turntables being rotatable to position the lens means at two different positions in the line of vision between said sight openings and said wall portion, one position being for effectively projecting said test target means visible thereto selectively at infinity and the other for rendering the test target means visible at near vision distance, lever means connecting said housing to said supporting frame whereby said housing may be angularly adjusted on said supporting frame about a predetermined center to cause a patient viewing said test target means through said sight openings to view along lines of vision simulating lines of vision normally assumed for near vision and infinity viewing, operating mechanism connected with said turntables and with said lever means for automatically causing the required rotation of said turntables upon movement of said lever means when said housing is adjusted to selected angular positions for near distance and infinity viewing to correspondingly locate the lens means, and locking means for retaining said supporting frame in at least one selected adjusted position on said uprights.

14. An eye testing device of the character described comprising a base, spaced uprights on said base, a supporting frame vertically adjustable on said uprights, adjusting means for positioning said supporting frame on said uprights in desired spaced relation with said base comprising pinion means carried by said supporting frame and functioning cooperatively with a rack carried by said uprights, operating means for manually controlling said pinion means and comprising a clutch device for permitting manual operation of said pinion means and preventing accidental displacement of said supporting frame from selected adjusted position, and a housing carried by said supporting frame and movable therewith on said uprights, said housing having sight openings therein at one end and having a wall portion therein spaced from said sight openings, means for alternately positioning a succession of test target means in openings in the wall portion, said means comprising compartments in said housing each of which is adapted to receive a respective film spool, manual control means extending into said compartments for engagement with a respective spool therein whereby a respective spool may be rotated to wind a film thereupon from the other of said spools, a pair of turntables pivotally supported in said housing, one before each sight opening, to rotate about axes perpendicular to the lines of sight through said sight openings, lens means on each turntable, said lens means when in the line of vision between said sight openings and said wall portion being adapted for effectively projecting said test target means visible thereto selectively at infinity when at one position and for rendering said test target means visible at near vision distance when located at a second position in said line of vision, said turntables being rotatable 180 degrees to locate the lens means in said two positions, lever means connecting said housing to said supporting frame whereby said housing may be angularly adjusted on said supporting frame about a predetermined center whereby a patient viewing said test target means through said sight openings will view along lines of vision simulating lines of vision normally assumed for near vision and infinity viewing, and operating mechanism connected with said turntables and with said lever means for automatically causing said required rotation of said turntables through substantially one hundred and eighty degrees in response to movement of said lever means to locate said housing in selected angular positions, whereby said lens means will be automatically positioned for near distance and infinity viewing in accordance with the angular adjustment of the housing for such viewing.

15. An eye testing device of the character described comprising a base, spaced uprights on said base, a supporting frame vertically adjustable on said uprights, adjusting means for positioning said supporting frame on said uprights in desired spaced relation with said base comprising pinion means carried by said supporting frame and functioning cooperatively with a rack carried by said uprights, operating means for manually controlling said pinion means and comprising a clutch device for permitting manual operation of said pinion means and preventing accidental displacement of said supporting frame from selected adjusted position, and a housing carried by said supporting frame and movable therewith on said uprights, said housing having sight openings therein at one end and having a wall portion therein spaced from said sight openings, means for alternately positioning a succession of test target means in openings in the wall portion, said means comprising compartments in said housing each of which is adapted to receive a respective film spool, manual control means extending into said compartments for engagement with a respective spool therein whereby a respective spool may be rotated to wind a film thereupon from the other of said spools, manually operable aligning means extending into said housing for aligning targets carried by said film with said openings in the wall portions, a turntable rotatably supported in the housing before each sight opening, to turn about an axis perpendicular to the line of sight through the sight opening, lens means on each turntable, said turntables being rotatable through 180 degrees to locate the lens means at a pair of positions in the line of vision between said sight openings and said wall portion, said lens means when in one position of adjustment effectively projecting said test target means visible thereto at infinity and when at the other position rendering the test target means visible at near vision distance, lever means connecting said housing to said supporting frame whereby said housing may be angularly adjusted on said supporting frame about a predetermined center so that a patient viewing said test target means through said sight openings may selectively view along lines of vision simulating lines of vision normally assumed for near vision and infinity viewing, and operating mechanism connected with said turntables and with said lever means for automatically causing said rotation of said turntables through substantially one hundred and eighty degrees in response to movement of said lever means to adjust said housing in selected angular positions for near distance and infinity viewing, whereby said lens means will be automatically moved into a corresponding location for said near distance and infinity viewing.

16. An eye testing device comprising a supporting frame, a housing having target means supported therein and a pair of sight openings axially aligned with said target means through which an observer may direct his sight to view the target means, mounting means movably connecting said housing to said supporting frame for permitting said housing to swing about a predetermined center to different given angular positions of use relative to said supporting frame whereby in one position of angled adjustment, the axes of said sight openings will be along lines of vision normally assumed for near distance viewing and in another position of angled adjustment of the housing said axes will be along lines of vision normally assumed for infinity viewing, reversible lens means rotatably mounted in said housing between said sight openings and target means and adapted to turn about axes eccentrically related therewith and perpendicular to the lines of vision, said lens means when rotated to one position of use adjacent said sight openings and axially aligned with said lines of vision, rendering the test target means visible therethrough as at infinity and when rotated to a second position of use more remote from said sight openings and axially aligned with said lines of vision, rendering the test target means visible therethrough as at a position for near distance vision testing, and control means operably connecting said mounting means with said lens means and acting in response to the swing of the housing to automatically locate the lens means at said first-mentioned position when the housing is in its angled position for infinity viewing and to locate the lens means at the second-mentioned position when the housing is in its angled position for near distance viewing.

17. An eye testing device comprising a base, a housing mounted on said base, test target supporting means in said housing, means on one side of the test target supporting means for lighting the same, sight openings in a wall of the housing on the opposed side of the test target supporting means through which an observer may direct his sight to view test targets supported in said housing, mounting means movably connecting said housing to said base for permitting said housing to swing about a predetermined center to different given angular positions relative to said base, whereby in one position of angled adjustment, the axis of said housing will be along lines of vision normally assumed for near distance viewing and in another position of angled adjustment of the housing its axis will be along lines of vision normally assumed for infinity viewing, lens means rotatably mounted in said housing to turn about axes perpendicular to the lines of vision for adjustment to different positions in alignment with the direction of the axis of said housing, said lens means when in one position rendering the test target means visible therethrough as at near distance and when at a second position axially spaced from said first position effectively rendering the test target means visible therethrough as at infinity, and control means operably connecting said mounting means with said lens means and acting in response to the swing of the housing to locate the lens means at said first-mentioned position when the housing is in its angled position for near distance viewing and to locate the lens means at the second-mentioned position when the housing is in its angled position for infinity viewing.

References Cited in the file of this patent

UNITED STATES PATENTS

| | | |
|---|---|---|
| 726,101 | Reich et al. | Apr. 21, 1903 |
| 760,458 | Lawall | May 24, 1904 |
| 2,033,529 | Lee | Mar. 10, 1936 |
| 2,095,235 | Ames | Oct. 12, 1937 |
| 2,147,957 | Ames | Feb. 21, 1939 |
| 2,364,793 | Jobe et al. | Dec. 12, 1944 |
| 2,481,582 | Ellis | Sept. 13, 1949 |
| 2,485,272 | Freeman | Oct. 18, 1949 |